April 25, 1967 R. E. HUFNAGEL ETAL 3,316,348
SCANNING SYSTEM FOR RECORDING PICTORIAL DATA
Filed May 1, 1963 2 Sheets-Sheet 2
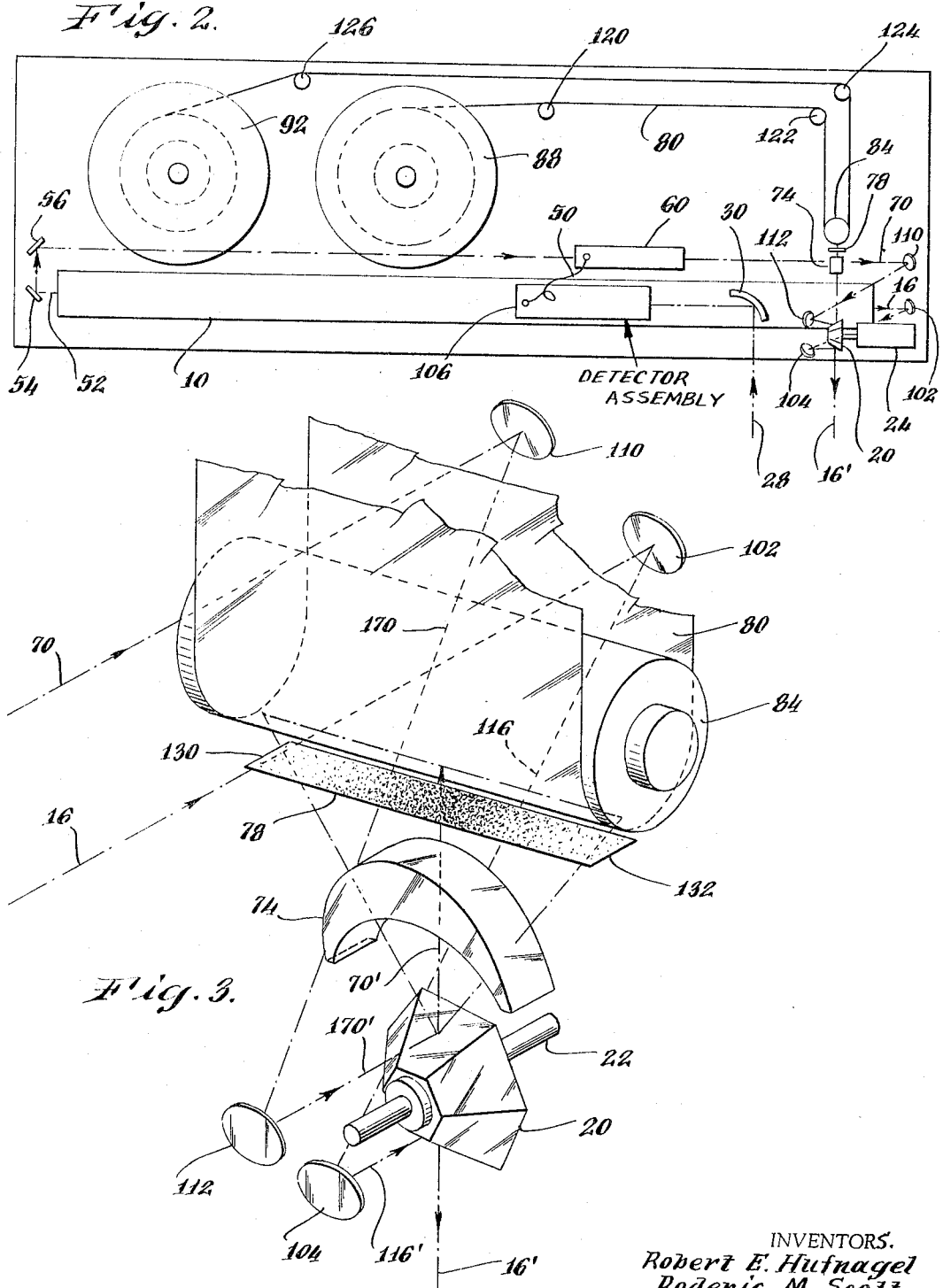
INVENTORS.
Robert E. Hufnagel
Roderic M. Scott
BY
Daniel R. Levinson
ATTORNEY

United States Patent Office 3,316,348
Patented Apr. 25, 1967

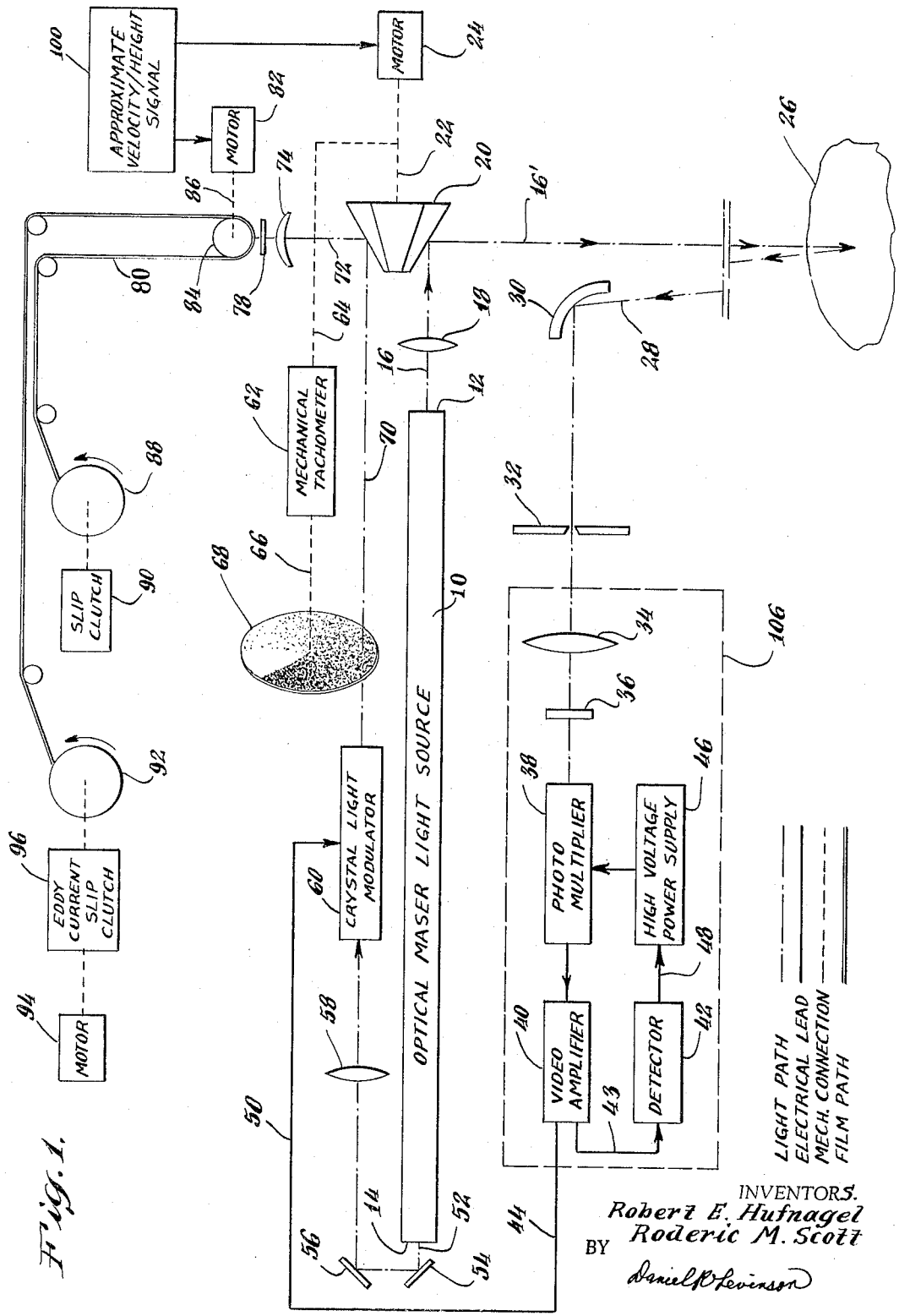

3,316,348
SCANNING SYSTEM FOR RECORDING PICTORIAL DATA
Robert E. Hufnagel, Ridgefield, and Roderic M. Scott, Stamford, Conn., assignors to The Perkin-Elmer Corporation, Norwalk, Conn., a corporation of New York
Filed May 1, 1963, Ser. No. 277,290
9 Claims. (Cl. 178—6.7)

This invention relates to a recording system of the scanning type in which the parts of the subject being then recorded are illuminated by a moving radiant energy beam. More specifically, the inventive device utilizes an optical maser (or laser) and a beam moving means for incrementally illuminating an object, means for collecting the reflected radiant energy from the object, and means for permanently recording a pictorial representation of the object from this returned radiant energy.

The specific embodiment hereinafter more fully described is designed to make a photograph recording of a large dark object, such as a long strip of terrain as viewed from an airplane at night, by means of an extremely narrow radiant energy beam (such as that produced by an optical maser), which beam is caused to line scan the object, for example, in a rectilinear pattern. In the specific embodiment hereinafter disclosed, the return light is focussed on a photomultiplier which yields a signal proportional to the reflectivity of each of the incremental areas sequentially illuminated by the optical maser. This signal is then utilized to modulate the intensity of a light beam which is caused to scan a photographic film. By causing the scanning movement of the illuminating optical maser light beam and the scanning of the photographic film by the second light source to be synchronous, the photographic record will accurately reproduce the subject being photographed. This synchronization is preferably accomplished by utilizing the same physical element (a rotating multi-sided mirror) to effect the scanning of the subject and the scanning of the film.

An object of the invention is the provision of a photo-recording device which is capable of making a permanent record of an extensive dark subject at relatively high resolution.

A further object of the invention is the provision of such a photo-recording device which may be utilized in the presence of rapid linear movement of the entire photo-recorder device relative to the object being photographed.

Another object of the invention is the provision of such a photo-recorder in which the illuminating means is not readily detected from a position near the object being photographed.

The further object of the invention is the provision of an active photographing device having the above mentioned advantageous characteristics, so as to be particularly suitable for photo-reconnaissance by low flying, relatively fast aircraft.

Further objects and advantages of the invention will be obvious to one skilled in the art upon reading the following specification in conjunction with the accompanying drawings in which:

FIGURE 1 is a schematic representation of the entire photo-recording device;

FIGURE 2 is a side elevation of the entire device, with the cover removed and some minor parts omitted for clarity; and FIGURE 3 is a detail perspective view of the scanner utilized for moving the illuminating beam along the ground and the recording beam along the film.

In FIGURE 1 an optical maser utilized as the light source is shown at 10. The reflective coatings at each of its ends 12 and 14 are of such relative thickness that most of the light produced by this constantly emitting gas phase laser will leave the right-hand end along the light path indicated by ray 16. An optical system, schematically illustrated as lens 18 is utilized to collimate this light as it travels to a mechanical scanner of the reflector type shown at 20. The collimated monochromatic coherent beam is reflected from the lower surface of rotating mirror scanner 20 so as to be directed downwardly towards the ground 26 as shown at 16'. As more clearly shown in FIGURE 3 this reflective scanner 20 is in the form of a frustrated pyramid having, for example, six sides. It is mounted for rotation about the axis defined by horizontal shaft 22 and rotated about this axis (for example, by rotation of this shaft) by means of a motor 24 (see FIGURE 1). Rotation of this pyramid reflector will cause the laser beam to be scanned in the vertical plane perpendicular to the plane of the paper in FIGURE 1 so as to cause successive illumination of a strip of the terrain therebelow, which is at the intersection of this vertical plane and the ground. In other words, assuming a horizontal line in FIGURE 1 represents the horizontal flight path, a narrow strip of the ground directly below extending traversely to the flight path will be illuminated by movement of one facet of the scanner. In particular, as the scanner is in the form of a frustrated pyramid having six sides, each of which makes a 45° angle with the axis of the pyramid, the light beam 16' will be caused to scan a 60° transverse field on the ground as seen from the airplane.

The light returning from the ground 26 along light path 28 will be gathered by an optical system, illustrated as comprising a semi-parabolic mirror 30. In actuality a modified Schmidt, or other catadioptric optical system (the design of which is simplified because of the monochromatic nature of the beam) may actually be used for this purpose, the off-axis paraboloid being illustrated solely for simplicity. The light from the ground is then imaged at a slit means 32 by the collecting optical system. This slit will allow only that light which originated along the illuminated strip of the ground to pass through to a relay optical system, exemplified by lens 34 which focusses the light onto a photomultiplier 38 after it has passed through spectral filter 36. Elements 32 and 36 are therefore eliminated most of the extraneous light originating from the terrain, since only that radiant energy which has substantially the same wave length as that of the laser (for example 6,328 Angstroms) and which originates from the particular ground strip being illuminated will reach the photomultiplier.

The signal from photomultiplier 38 representative of the intensity of the laser beam reflected from the ground at any given time during the scan is amplified by video amplifier 40. In order to adapt the photomultiplier sensitivity to usually strong signals (for example when the aircraft is at low level over highly reflective terrain) an automatic gain control circuit is included. This may comprise a detector 42 which monitors the general level of the video amplifier output 43 and controls the sensitivity of the photomultiplier by modifying its operating voltage supplied by its high voltage power supply 46 as indicated by the lead 48 labeled AGC. The output of the video amplifier is carried over lead 50 to intensity modulate the light beam which is scanned across a photographic film. This light beam may be derived from the left-hand end 14 of the optical maser as shown by light path 52. For the purpose of conserving space this second, weaker light beam may be doubled back by means of two plane reflectors or mirrors 54 and 56 in the manner illustrated in FIGURE 1. The reason that this will normally save space is that the gas phase optical maser is quite long (see FIGURE 2) as will be pointed out hereinafter. After such deflection the light beam may be focussed by optical means (schematically illustrated as simple lens 58) into relatively long electro-optical crystal modulator 60.

Such a crystal has the characteristic of optically rotating the polarization plane of a beam of light passing therethrough in accordance with the electrical voltage supplied to the crystal. By mounting a polarizing filter at each end of the crystal, such a system may be utilized as a variable shutter or diaphragm since rotation of the plane of polarization of the beam varies the intensity of the light which passes through the second polarizer. Such a modulator, which may utilize potassium dihydrogen phospate (KDP) as the crystal, is described in an article by R. Carpentier entitled "Electro-Optical Sound-On-Film Modulator" in the Journal of the Acoustical Society of America, volume 25, Number 6 (November 1953) pages 1145 to 1148. Since the light beam for the laser is already polarized, the polarizer at the front (i.e., left-end in FIGURE 1) of the crystal modulator 60 is eliminated, thereby increasing its transmission efficiency. Thus, the video output at 50 will cause the modulator to vary the intensity of the light beam 52 so as to make it correspond with the intensity of the radiant energy returned from the ground and impinging upon photomultiplier 38.

The mechanical tachometer 62 is connected to the driven train of the pyramid mirror 20 as indicated by dash line 64. The output of the tachometer, which can be driven by drive roller 84 (described below) instead, positions (by means of shaft or other mechanical connection 66) a variable transmission filter disk 68. This variable neutral intensity filter is so designed that contiguous sectors are increasingly (in one direction around the periphery of the disk) more dense or opaque. In actuality, the gradation from completely transparent to substantially opaque is made gradually so that the part of the filter in the light beam can cause any desired attenuation in the intensity passing therethrough. In a sense the tachometer and this filter act as an automatic gain control to compensate for the rotational velocity of mirror 20. Thus, when the pyramid 20 is rotating very rapidly, the tachometer will position a relatively transparent part of filter disk 68 in the light beam 70 emerging from the modulator and positions a more and more optically dense part of the filter disk 68 in the beam when the mirror is rotated at lesser velocities. After passing through this filter light beam 70 will be reflected from that mirror surface of pyramid 20 which is more or less facing upward in FIGURE 1. The tilting of this upper mirror surface of the rotating pyramid will cause a transverse linear movement of the reflected beam 72, which is focussed by an optical system (exemplified by simple lens 74) upon the moving film 80. Before reaching the film however, the beam 76 is passed through a filter 78 transparent at its two ends (behind and in front of the plane in FIGURE 1) and gradually shaded to a moderate degree of optical intensity at its center (see FIGURE 3). This filter 78 thereby compensates the loss of energy content at the ends of the scan relative to the center which would otherwise be caused as explained below.

The film 80 is driven at a contant linear velocity by means of a motor 82 which rotates drive roller 84 as indicated by mechanical connection 86. The film is taken off a supply roll 88 which is gently retarded by means of, for example, a slip clutch 90. After exposure the film is wound on a take-up spool 92 by means of taken-up motor 94 operating through a slip mechanism such as an eddy current slip clutch 96. The speed of rotation of the motor 24 rotating the reflective pyramid and motor 82 (which determines the film speed) are maintained approximately equal to each other and proportional to the apparent ground speed of the aircraft by means of a signal roughly equal to the ratio of the aircraft velocity divided by its altitude or height as indicated at 100.

In view of the incremental scanning technique utilized, it is not essential that the film speed exactly compensate for the apparent image motion in order to avoid the blurring of the film image. Because of the fact that the same element (namely, the mirror pyramid 20) is utilized to scan the ground with the illuminating beam and the film with the recording beam, no variable errors in the position of the image relative to the actual position on the ground are possible. Although too rapid or too slow rotation of drive roll 84 by motor 82 will cause respectively, a longitudinal stretching or shrinking type of distortion, any such errors are easily compensated for in the interpretation of the photograph. Of course, this distortion may be eliminated by the use of a precise velocity divided by height ($V/h$) signal being utilized at 100. Thus, the quality of the pictures obtained, as far as interpretation is concerned, is independent of small errors in the $V/h$ determination. It should be noted that other methods of recording the image (such as the use of a cathode ray tube trace) require exact synchronization, while the present device (by utilizing the same element 20 for both ground illumination and photographic scanning) eliminates any and all synchronizing errors which may occur with prior systems.

FIGURE 2 is a side elevation of a physical embodiment of the system schematically illustrated in FIGURE 1. In order to simplify FIGURE 2, only the major functional elements are shown therein, the positioning of the omitted less basic elements being obvious from consideration of this figure in conjunction with FIGURE 1. In FIGURE 2 the optical maser light source 10 is again shown as emitting at its right hand end the main light beam 16 which is reflected by means of plane mirrors 102 and 104 to the lower surface of rotating pyramid reflector 20. The reflected light beam 16' will then pass downwardly through an aperture in the camera housing so as to illuminate the ground in a manner previously described. The reflected light from the ground traveling upwardly along path 28 will be reflected by optical system 30 to the detector assembly 106 (which includes elements 32 through 48). The electrical output of this assembly, carried by lead 50, will control the KDP light modulator 60 as previously described. The weaker light beam from the left-hand end of the optical maser 10 will proceed along path 52 so as to be reflected by plane mirrors 54 and 56 to modulator 60 in a manner previously described. After modulation the emergent light beam 70 will be reflected by plane mirrors 110 and 112 so as to impinge upon the upper most reflective surface of pyramid mirror 20. Upon reflection by this surface the light will pass through lens 74 and filter 78 as (previously described) so as to encounter the film at the bottom of drive roller or drum 84. The film may be guided from supply spool 88 to this drum by conventional guide rollers 120, 122, and may be guided from drive roller 84 back to the take-up spool 92 by similar guide rollers 124, 126.

The manner in which the main light beam of the optical maser (which lies behind the plane of the film and pyramid 20 in FIGURE 2) impinges upon the surface of the pyramid, and manner in which the secondary beam after passing through modulator 60 (which is also behind the film and pyramid 20) reaches the upper surface of the pyramid is more clearly illustrated in FIGURE 3. In this figure, which is a perspective view of the lower right-hand corner of FIGURE 2 as seen generally from the left and slightly above, the light from the right-hand end of the optical maser is shown at 16. This light is reflected by plane mirror 102 so that the reflected ray path 116 is angled relative to both the horizontal plane (as best seen in FIGURE 2) and the vertical plane (i.e., the plane of the paper in FIGURE 2) as best seen in FIGURE 3. The light beam is then reflected by plane mirror 104 along light path 116' parallel to and directly below the axis of pyramid 20. For this reason the light beam 16' reflected from the lower face of pyramid 20 will be rotated through an angle, which is symmetrically arranged about the vertical as indicated.

As previously stated, the maximum scan angle obtained with this particular geometry is 60° (i.e., 30° on each side of the vertical). Although it is possible to increase the scanning angle to more than 60° (for example by decreasing the number of faces of the pyramid), the fall off in intensity at the edges of the scan will become an increasingly difficult problem as the angle is enlarged. In fact, it is preferable to utilize slightly less than the 60° available field of a six-sided pyramid (in which the faces make a 45° angle with the axis), so as to allow clean transitions between faces.

FIGURE 3 also illustrates the path of the secondary light beam 70 from the modulator to the top of the reflecting pyramid. Thus, plane mirror 110 is positioned directly above mirror 102 so as to reflect the secondary beam along path 170 to mirror 112, situated above mirror 104. Upon reflection by this mirror 112 the beam 170' will proceed parallel and directly above axis of pyramid 20. Upon reflection from the upper surface of the pyramid, the beam 70' will pass through lens 74, which is designed to cause the beam to be focussed in a substantially flat plane throughout a large transverse angle. Before reaching the film 80 the beam passes through a filter 78 as previously stated. This filter is substantially transparent at its two ends 130 and 132 but becomes increasingly optically dense near its center. The filter therefore compensates for the fact that the ground near the ends of the scan (i.e., the illuminated areas farthest removed from the vertical plane passing through the longitudinal axis of the aircraft) are illuminated with somewhat less intensity. Additionally, much of the light reflected by such ground areas at a substantial angle from the vertical is not returned to the camera, since the light will tend to be reflected by the ground at an angle equal to the scan angle but in the opposite sense. Similarly the intensity of the light from the modulator will be somewhat diminished at the larger scanning angles. By properly designing the variable transmission of this filter 78, all of these factors tending to cause the center to be overexposed relative to the edges may be precisely compensated.

The entire system described above will cause repetitive line scans of the terrain below the aircraft to be made by the optical maser beam in a direction transverse to the aircraft direction. Because of the movement of the aircraft relative to the ground, each of these transverse scans will be made by one facet of the reflective pyramid at a distance in front of the previous scan (made by the adjacent facet) equal to the distance the aircraft has moved between scans. Assuming the aircraft is flying at five hundred feet per second at an altitude of five hundred feet (so that $V/h$—one radian per second), a rotational velocity of the optical scanner 20 of ten thousand rotations per minute will cause sixty thousand scans per minute (or 1,000 per second), so as to cause each scan line to be displaced from the next one by one milliradian. Since the diameter of the optical maser beam can be extremely accurately collimated, the incremental area on the ground illuminated at any given time may be maintained less than the line scan width (for example ½ milliradian). Although the optical system (exemplified by element 30) will initially gather energy from a relatively large area, the slit 32 is so designed as to pass radiation originating from an extremely narrow (for example two or three milliradian) field of view. In other words, slit 32 passes only the radiation from the general area that has just been scanned by the laser beam. Spectral filter 36 (which may have a bandpass width of one hundred Angstroms) will further reduce the effect of any extraneous radiant energy in this narrow field. Photomultiplier 38 will therefore develop a signal proportional to the reflectivity of the terrain being scanned and will cause the KDP light modulator to vary the intensity of the recording beam 70 so as to be proportional to this reflectivity. Therefore the film 80 is laterally scanned by a moving beam of light the intensity of which responds to the reflectivity of the terrain below the aircraft.

Since the same means (namely reflective scanner 20) is utilized for generating both the illuminating beam scan of the ground and the recording beam scanning of the film, each scan line recorded will necessarily exactly correspond to the scans made on the ground. As previously mentioned, variable transmission filter 68 may be utilized to compensate for different rotational rates of the reflective scanner 20 (which will rotate at a velocity approximately proportional to $V/h$). Since the film is also moved at a different speed according to $V/h$, this transmission filter may be designed to also compensate for this film speed variation. Alternatively, the eddy current slip clutch 96 may be utilized to generate a signal to position the variable transmission filter 68 rather than the tachometer 62 as shown. As previously mentioned, no accurate image motion compensation need be accomplished because of the scanning method of recording the image on the film. Thus, the only effect of incorrect film speed will be to cause the successive scan lines to be spaced too far apart or too close together on the film so as to cause either a stretching or shrinking of the length of objects on ground as measured along the flight direction.

In order to obtain approximately one milliradian resolution, a ½ milliradian diameter optical maser beam is preferably utilized. If 50° of the 60° scan field obtainable with the six sided pyramid is actually utilized, there will be approximately two million bits of information obtained per second. These bits include approximately two thousand scan diameters per line and one thousand lines per second (assuming the same pyramid rotation rate and other parameters given above). The video information band width is approximately ½ of this so that the entire system must be able ot respond to a frequency at least as high as one megacycle. For this reason a rapid response photomultiplier (such as RCA 7265 or EMI 955B) and a high frequency amplifier should be utilized. The KDP light modulator is capable of responding to signals of over a one thousand megacycles (which is the primary reason for its use herein) so that it may be caused to modulate the light at the desired frequency with no difficulty. For $V/h$ values less than one the scanning rate may be reduced proportionally so as to lower the necessary (time) frequency response of the system.

A camera having the above-mentioned parameters and an optical receiving or collecting system (30) equal to a semi-circle of 6" diameter is intrincially capable of taking pictures with one milliradian resolution at altitudes of two hundred to one thousand feet and at aircraft speeds up to the speed of sound (as long as the ratio $V/h$ does not exceed about 2). In order to obtain sufficient energy to actuate the photomultiplier, the actual optical power output of the main laser beam should be at least thirty milliwatts. The intensity of the beam utilized to scan the film may be of considerably less magnitude (for example, 2 milliwatts before modulation) since the losses in this part of the system are much smaller. Although the illustrated apparatus uses the weaker beam of the optical maser as the photo-recording beam, any other suitable light source may obviously be used for this purpose. On the other hand it would be extremely difficult to find any device other than the optical maser which is capable of illuminating an extremely small area of the ground (for example a half milliradian diameter circle) with the intensity of radiation that can be obtained with the laser. Thus, the use of the secondary laser beam (52) to scan the film is actually a simplification of the device in that no separate second light source is required.

The invention has been illustrated in its preferred form, in which a single laser is used to supply both the scanning beam for illuminating the object and the energy for recording the video output of the photomultiplier on photographic film. As mentioned above, performance of this latter function by the laser actually simplifies the apparatus when the final recording is done photographically. However, the recording may be accomplished by any means which can faithfully record the high frequency output signal of the photomultiplier (caused by variation in reflectivity of the various parts of the object being scanned). Thus, rather than utilizing photographic film and radiant energy recording, a magnetic tape, recording head, and a suitable electronic circuit may be utilized to record the photomultiplier output. Similarly, other suitable electronic or other recording means may be utilized for this purpose.

Since many of the mechanical, optical and electronic elements may be modified and many different elements may be substituted therefor, the invention is not limited to use of any of the specific elements illustrated or described. Rather, the invention is defined solely by the scope of the appended claims.

We claim:

1. A camera system for photographing an extended dark object comprising:
   means for producing a bright narrow beam of radiant energy;
   first deviating means for causing said radiant energy beam to scan the object;
   means for receiving reflected radiant energy from said object and detecting its intensity;
   means for producing a photographically actinic beam;
   said means for producing a narrow energy beam and said means for producing a photographically actinic beam comprise at least one common major element;
   modulating means for causing the intensity of said actinic beam to vary substantially in proportion to the intensity of said received reflected radiant energy;
   and second deviating means for causing said actinic beam to scan a photographic film in a pattern similar to that caused by said first deviating means;
   said first and said second deviating means comprising at least one common major component so as to cause inherently synchronous operation;
   whereby an accurate photographic representation of said object is obtained.

2. A camera system according to claim 1, in which: said first deviating means and said second deviating means comprise the same rotating reflecting means.

3. A camera system according to claim 2, in which: said rotating reflecting means comprises a body having a plurality of angled reflecting surfaces.

4. A camera according to claim 1, in which: said common major element is a light source.

5. A camera system according to claim 4, in which: said common light source is an optical maser.

6. A camera system according to claim 1, in which: said modulating means comprises an electro-optical means capable of modulating said actinic beam intensity at frequencies at least as great as one megacycle.

7. A camera system according to claim 6, in which: said optico-electrical means comprises a potassium dihydrogen phosphate crystal and means for applying a modulated electrical field thereto.

8. A camera system for photographing an extended dark object comprising:
   means for producing a bright narrow beam of radiant energy;
   first deviating means for causing said radiant energy beam to scan the object;
   means for receiving reflected radiant energy from said object and detecting its intensity;
   means for producing a photographically actinic beam;
   modulating means for causing the intensity of said actinic beam to vary substantially in proportion to the intensity of said received reflected radiant energy;
   second deviating means for causing said actinic beam to scan a photographic film in a pattern similar to that caused by said first deviating means;
   said first and said second deviating means comprising at least one common major component so as to cause inherently synchronous operation;
   and means compensating for the intensity variations in said photographically actinic beam caused by the different angles and path lengths of said radiant energy and said photographically actinic beams during the various parts of their scanning cycle;
   whereby an accurate photographic representation of said object is obtained.

9. A system for recording the pictorial content of an extended dark object comprising:
   an optical maser for producing a bright narrow beam of radiant energy;
   deviating means for causing said radiant energy beam to scan the various parts of said object;
   means for collecting said energy beam after reflection by said various parts of said object;
   means for detecting the intensity of said reflected energy beam and for producing a signal proportional to said reflected beam intensity corresponding to said various parts of said object;
   optical maser means for producing a photographically actinic beam;
   means for modulating said actinic beam according to said reflected beam intensity signal;
   and means for scanning said modulated actinic beam across a photographic material in a path corresponding to the scanning of said object by said radiant energy beam;
   whereby data representative of the pictorial content of said object is recorded;
   said means for scanning said modulated actinic beam across said photographic material and said deviating means comprising at least one common major component, so as to cause inherently synchronous operation thereof.

References Cited by the Examiner

UNITED STATES PATENTS 3,019,292  1/1962  John _____ 178—7.6 X

OTHER REFERENCES

Electronics, Nov. 3, 1961, p. 44.

DAVID G. REDINBAUGH, *Primary Examiner.*

H. W. BRITTON, *Assistant Examiner.*